US009068463B2

(12) United States Patent
Pandey et al.

(10) Patent No.: US 9,068,463 B2
(45) Date of Patent: Jun. 30, 2015

(54) SYSTEM AND METHOD OF MONITORING TURBINE ENGINES

(75) Inventors: Achalesh Kumar Pandey, Greenville, SC (US); Ravi Yoganatha Babu, Bangalore (IN); Richard John Rucigay, Saratoga Springs, NY (US); Necip Doganaksoy, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 151 days.

(21) Appl. No.: 13/304,058

(22) Filed: Nov. 23, 2011

(65) Prior Publication Data
US 2013/0131951 A1    May 23, 2013

(51) Int. Cl.
| | |
|---|---|
| *F02C 9/00* | (2006.01) |
| *F02C 9/16* | (2006.01) |
| *F02C 9/18* | (2006.01) |
| *F02C 9/28* | (2006.01) |
| *F02C 9/52* | (2006.01) |
| *F01D 5/14* | (2006.01) |

(52) U.S. Cl.
CPC . *F01D 5/141* (2013.01); *F02C 9/28* (2013.01); *F02C 9/00* (2013.01); *F02C 9/18* (2013.01); *F02C 9/16* (2013.01); *F02C 9/52* (2013.01); *F05D 2260/80* (2013.01); *F05D 2240/127* (2013.01); *Y02T 50/673* (2013.01)

(58) Field of Classification Search
USPC ........................................................ 701/100
See application file for complete search history.

(56) References Cited

U.S. PATENT DOCUMENTS

| | | | | |
|---|---|---|---|---|
| 3,867,717 | A | * | 2/1975 | Moehring et al. ............. 340/626 |
| 4,060,979 | A | * | 12/1977 | Elsaesser et al. ................ 60/773 |
| 4,137,710 | A | * | 2/1979 | Preti et al. ........................ 60/223 |
| 4,603,546 | A | * | 8/1986 | Collins ............................ 60/773 |
| 4,756,152 | A |   | 7/1988 | Krukoski et al. |
| 4,794,760 | A | * | 1/1989 | White .............................. 60/785 |
| 5,313,778 | A |   | 5/1994 | Sweet et al. |
| 5,726,891 | A | * | 3/1998 | Sisson et al. ................... 701/100 |
| 5,819,555 | A |   | 10/1998 | Engdahl |
| 5,857,321 | A | * | 1/1999 | Rajamani et al. ............ 60/39.27 |
| 6,059,522 | A | * | 5/2000 | Gertz et al. ........................ 415/1 |
| 6,082,133 | A |   | 7/2000 | Barclay et al. |

(Continued)

OTHER PUBLICATIONS

Hamill et al., "501-KH Speed Sense Valve Improvements", ATUA Conference, Oct. 2002.

(Continued)

*Primary Examiner* — Fadey Jabr
*Assistant Examiner* — Kevin P Mahne
(74) *Attorney, Agent, or Firm* — Ann M. Agosti

(57) ABSTRACT

A monitoring system for use with a turbine engine is described herein. The turbine engine includes a compressor and at least one compressor bleed valve coupled to the compressor. The monitoring system includes at least one sensor that is for sensing an operational parameter of the compressor bleed valve, and a controller that is coupled to the sensor and the compressor bleed valve. The controller is configured to determine an operating mode of the turbine engine and receive a monitoring signal indicative of the sensed operational parameter. The controller is also configured to calculate at least one operational value of the compressor bleed valve based at least in part on the sensed operational parameter. The controller is further configured to determine a condition of the turbine engine based at least in part on the calculated compressor bleed valve operational value.

20 Claims, 3 Drawing Sheets

(56) References Cited

U.S. PATENT DOCUMENTS

| | | | |
|---|---|---|---|
| 6,141,951 A * | 11/2000 | Krukoski et al. | 60/772 |
| 6,481,210 B1 * | 11/2002 | Chapman | 60/772 |
| 6,843,060 B2 | 1/2005 | Gallant et al. | |
| 6,921,244 B2 | 7/2005 | Johnson | |
| 7,328,098 B1 | 2/2008 | Vanderleest et al. | |
| 2002/0139180 A1 * | 10/2002 | Xiong et al. | 73/118.1 |
| 2004/0148961 A1 | 8/2004 | Clodic et al. | |
| 2005/0072186 A1 | 4/2005 | Amin et al. | |
| 2006/0144079 A1 | 7/2006 | Amin | |
| 2008/0302133 A1 | 12/2008 | Saysset et al. | |
| 2009/0100834 A1 * | 4/2009 | Sexton | 60/602 |
| 2010/0024471 A1 | 2/2010 | Hees et al. | |
| 2011/0023537 A1 | 2/2011 | Assink et al. | |
| 2012/0306513 A1 * | 12/2012 | Stradinger | 324/693 |

OTHER PUBLICATIONS

Electric Power Research Institute, Advanced Monitoring to Improve Combustion Turbine/Combined Cycle Reliability, Availability & Maintainability, Project report, Oct. 1, 2001.

\* cited by examiner

SYSTEM AND METHOD OF MONITORING TURBINE ENGINES

BACKGROUND OF THE INVENTION

The subject matter described herein relates generally to turbine engines and, more particularly, to systems and methods for use in monitoring the operation of turbine engines.

At least some known gas turbine engines include a compressor, a combustor coupled downstream from the compressor, a turbine, and a rotor assembly rotatably coupled between the compressor and the turbine. During operation of at least some known turbines, the compressor compresses air, which is mixed with fuel and channeled to the combustor. The mixture is ignited generating hot combustion gases that are channeled to the turbine. The turbine extracts energy from the combustion gases for powering the compressor, as well as producing useful work to power a load, such as an electrical generator, or to propel an aircraft in flight.

In at least some known gas turbine engines, compressor bleed valves regulate air flow through the compressor. Over time, during operation, the structural integrity of known compressor bleed valves may degrade causing the compressor bleed valves to fail, which causes the turbine engine to trip and move offline. Testing and inspection of at least some known compressor bleed valves require the turbine engine be shutdown to enable the compressor bleed valves to be removed and manually inspected. However, shutting the turbine engine down for manual inspection of valves may be time consuming, expensive, and/or increase the cost of operating the power generation system.

BRIEF DESCRIPTION OF THE INVENTION

In one embodiment, a monitoring system for use with a turbine engine is provided. The turbine engine includes a compressor and at least one compressor bleed valve coupled to the compressor. The monitoring system includes at least one sensor for sensing an operational parameter of the compressor bleed valve, and a controller that is coupled to the sensor and the compressor bleed valve. The controller is configured to determine an operating mode of the turbine engine and receive a monitoring signal indicative of the sensed operational parameter. The controller is also configured to calculate at least one operational value of the compressor bleed valve based at least in part on the sensed operational parameter, wherein the calculated operational value is associated with the determined operating mode. The controller is further configured to determine a condition of the turbine engine based at least in part on the calculated compressor bleed valve operational value.

In another embodiment, a turbine engine is provided. The turbine engine includes a compressor, a turbine coupled in flow communication with the compressor to receive at least some of the air discharged by said compressor, at least one compressor bleed valve coupled to the compressor, and a monitoring system operatively coupled to the compressor bleed valve and to the compressor. The monitoring system includes at least one sensor for sensing an operational parameter of said compressor bleed valve, and a controller that is coupled to the sensor and to the compressor bleed valve. The controller is configured to determine an operating mode of the turbine engine, and calculate at least one operational value of the compressor bleed valve based at least in part on the sensed operational parameter, wherein the calculated operational value is associated with the determined operating mode. The controller is further configured to determine a condition of the turbine engine based at least in part on the calculated compressor bleed valve operational value.

In yet another embodiment, a method of monitoring a turbine engine is provided. The turbine engine includes a compressor and a compressor bleed valve that is coupled to the compressor. The method includes determining, by a controller, an operating mode of the turbine engine. At least one monitoring signal indicative of an operating parameter of the compressor bleed valve is transmitted from a sensor to the controller. At least one operational value of the compressor bleed valve is calculated based at least in part on the received monitoring signal, wherein the calculated operational value is associated with the determined operating mode. A condition of the turbine engine is determined based at least in part on the calculated compressor bleed valve operational value.

DETAILED DESCRIPTION OF THE INVENTION

The exemplary methods and systems described herein overcome at least some disadvantages of known turbine engine systems by providing a monitoring system that can enable a condition of a compressor bleed valve to be determined while the turbine engine system remains online. Moreover, the embodiments described herein include a condition monitoring system that determines a compressor bleed valve condition based on a sensed operating parameter of the compressor bleed valve, wherein the sensed operating parameter is associated with an operating mode of the turbine engine. By determining the condition of the compressor bleed valve, the condition monitoring system facilitates preventing conditions such as turbine engine trip that may cause damage to the turbine engine system. Moreover, by determining a compressor bleed valve condition while the turbine engine system is online, the cost of operating the turbine engine system is reduced.

As used herein, the term "upstream" refers to a forward end of a turbine engine, and the term "downstream" refers to an aft end of a turbine engine.

Figure 1:
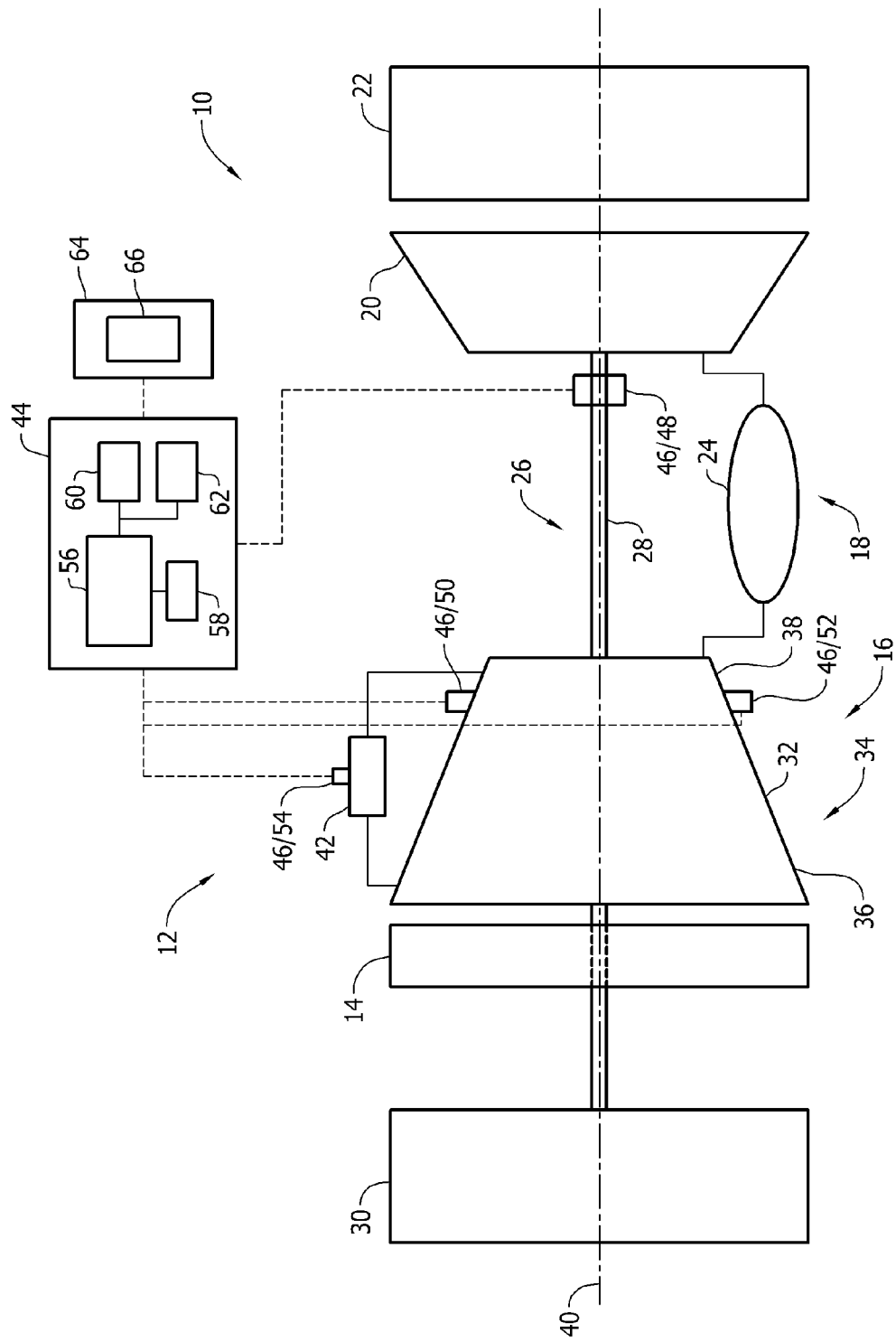
FIG. 1 is a schematic illustration of an exemplary turbine engine.
Figure 2:
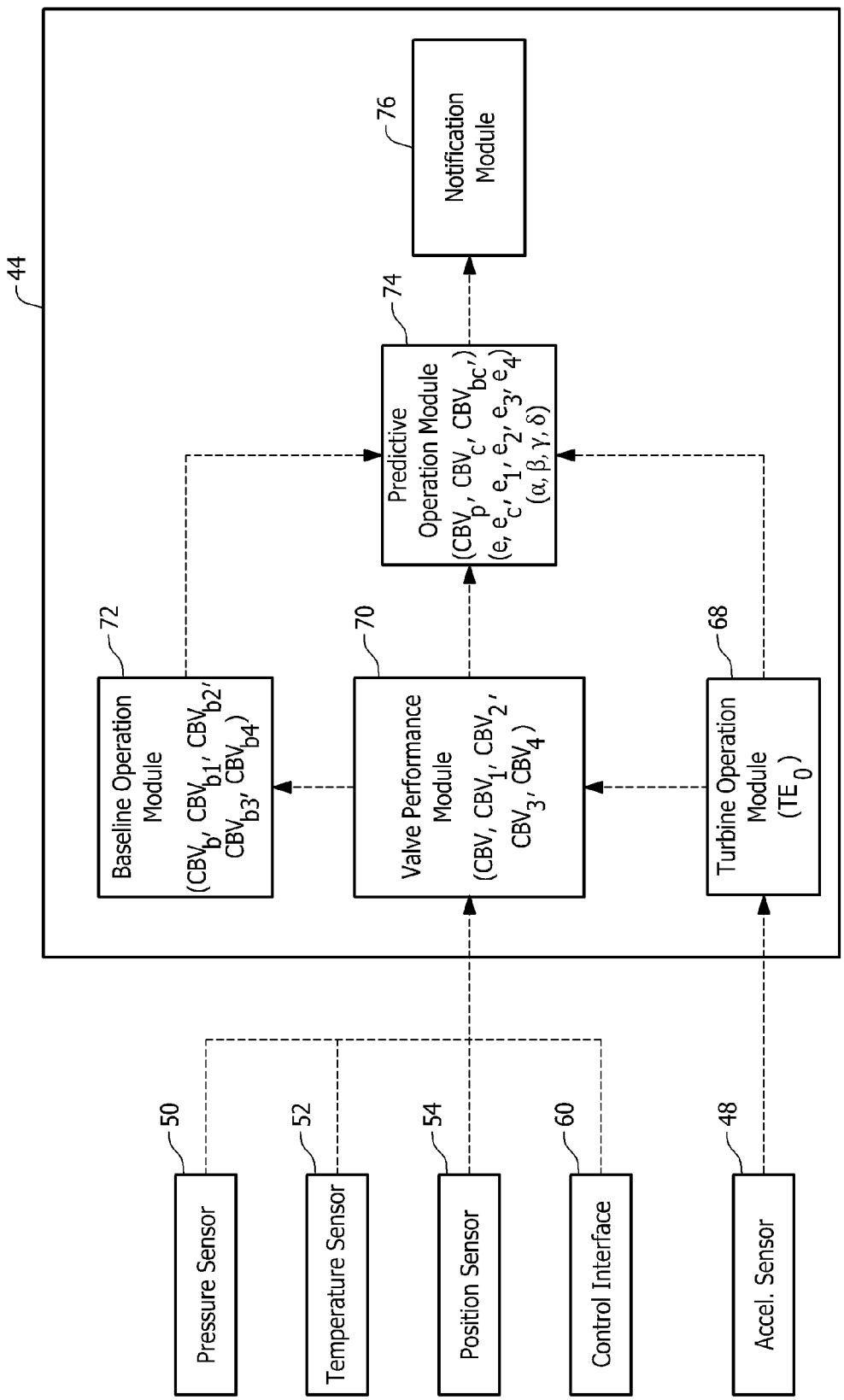
FIG. 2 is a block diagram of an exemplary monitoring system that may be used with the turbine engine shown in FIG. 1.

FIG. 1 is a schematic view of an exemplary turbine engine 10. FIG. 2 is a block diagram of an exemplary monitoring system 12 that may be used with turbine engine 10. In the exemplary embodiment, turbine engine 10 includes an intake section 14, a compressor section 16 downstream from intake section 14, a combustor section 18 downstream from compressor section 16, a turbine section 20 downstream from combustor section 18, and an exhaust section 22. Combustor section 18 includes a plurality of combustors 24. Combustor section 18 is coupled to compressor section 16 such that each combustor 24 is in flow communication with compressor section 16.

A rotor assembly 26 is coupled to turbine section 20 and compressor section 16. Rotor assembly 26 includes a drive shaft 28 that extends between turbine section 20 and compressor section 16. Turbine section 20 is rotatably coupled to compressor section 16 and to an electrical generator 30 with drive shaft 28 to impart a power loading to generator 30 during operation of turbine engine 10. Generator 30 is coupled to a power source, such as for example, an electric utility grid (not shown) for distributing electrical power to the utility grid.

In the exemplary embodiment, compressor section 16 includes a compressor 32 that includes a plurality of stages 34 that extend between an upstream section 36 and a downstream section 38 along a centerline axis 40. Each stage 34 is configured to channel air towards an adjacent stage 34 from upstream section 36 towards downstream section 38 such that compressed air is discharged from downstream section 38 into combustor section 18. In the exemplary embodiment, compressor section 16 includes at least one compressor bleed valve 42 that is coupled to compressor 32. Compressor bleed valve 42 is moved between an open position (not shown), and a closed position (not shown). In the open position, compressor bleed valve 42 enables at least a portion of air being channeled through compressor 32 to be channeled from upstream section 36 to downstream section 38 to bypass one or more stages 34. Moreover, in the open position, compressor bleed valve 42 enables a portion of air to bypass one or more stages 34 to adjust a pressure of air channeled through compressor 32 and/or adjust a temperature of compressed air discharged from compressor 32. In the closed position, compressor bleed valve 42 prevents air from bypassing stages 34.

During operation, air flows through compressor section 16 and compressed air is discharged into combustor section 18. Combustor section 18 injects fuel, for example, natural gas and/or fuel oil, into the air flow, ignites the fuel-air mixture to expand the fuel-air mixture through combustion, and generates high temperature combustion gases. Combustion gases are discharged from combustor section 18 towards turbine section 20 wherein thermal energy in the gases is converted to mechanical rotational energy. Combustion gases impart rotational energy to turbine section 20 and to rotor assembly 26, which subsequently provides rotational power to compressor section 16.

In the exemplary embodiment, turbine engine 10 is operated through a plurality of operating cycles, wherein each operating cycle includes a plurality of operational modes. In the exemplary embodiment, during an operating cycle, turbine engine 10 is selectively operable in a first or start-up mode, a second or power generation mode, and/or a third or shutdown mode. As used herein, the term "start-up mode" refers to a mode of operation in which a rotational speed of rotor assembly 26 is increased at a predefined rate of acceleration until rotor assembly 26 is rotated at a predefined speed with no electrical power load imparted to generator 30. As used herein, the term "power generation mode" refers to a mode of operation in which an electrical power load is imparted to generator 30 with rotor assembly 26 at the predefined speed such that turbine engine 10 is operated to generate a predefined power output of generator 30. Moreover, as used herein, the term "shutdown mode" refers to a mode of operation in which turbine engine 10 is moved offline wherein no power load is imparted to generator 30 and rotor assembly speed is reduced at a predefined rate of deceleration.

In the exemplary embodiment, the operation of turbine engine 10 may be selectively changed between start-up mode, power generation mode, and shutdown mode. During start-up mode, compressor bleed valves 42 are repositioned to the open position to enable a portion of air being channeled through compressor section 16 to bypass compressor stages 34 to facilitate reducing a compressor surge during gas turbine start-up. If compressor bleed valve 42 is in a closed position during start-up mode, compressor 32 may generate a compressed air surge through compressor 32, which may generate undesired vibrations within compressor 32 and/or stall compressor 32. Moreover, if compressor bleed valve 42 fails to open within predefined period of time during start-up mode, turbine engine 10 may trip and move offline.

During power generation mode, compressor bleed valves 42 are repositioned to the closed position to prevent air from bypassing compressor stages 34. If compressor bleed valve 42 is repositioned to the open position during power generation mode, compressor 32 may generate pressure fluctuations within compressed air being discharged towards combustor 24, and cause undesired combustion instability. In addition, if compressor bleed valve 42 opens during power generation mode, turbine engine 10 may trip and/or move to shutdown mode. During shutdown mode, compressor bleed valve 42 is repositioned to the open position to reduce a pressure differential across compressor 32 to facilitate reducing a rotational speed of rotor assembly 26. If compressor bleed valve 42 is repositioned to the closed position and/or fails to move to the open position during shutdown mode, compressor 32 may generate compressed air surge through compressor 32 and cause a turbine engine 10 to trip.

In the exemplary embodiment, monitoring system 12 is coupled to turbine engine 10 for monitoring an operation of turbine engine 10. Moreover, monitoring system 12 is configured to monitor a condition of compressor bleed valve 42 to facilitate determining whether compressor bleed valve 42 may fail during operation of turbine engine 10, and cause a trip of turbine engine 10. More specifically, monitoring system 12 is also configured to determine an operating mode of turbine engine 10, calculate an operational value of compressor bleed valve 42 associated with the determined operating mode, and determine a condition of turbine engine 10 based at least in part on the calculated compressor bleed valve operational value. In addition, monitoring system 12 is configured to determine a condition of turbine engine 10 to be less than a predefined condition upon determining the calculated compressor bleed valve operational value is different from a predefined operational value. Moreover, monitoring system 12 is configured to transmit a notification signal to a user upon determining that the condition of turbine engine 10 is less than the predefined condition.

In the exemplary embodiment, monitoring system 12 includes a controller 44 that is coupled in communication with a plurality of sensors 46. Each sensor 46 detects various parameters relative to the operation of turbine engine 10, and the operation and position of compressor bleed valve 42. Sensors 46 may include, but are not limited to only including, position sensors, vibration sensors, acceleration sensors, temperature sensors, pressure sensors, and/or any other sensors that sense various parameters relative to the operation of turbine engine 10, and the operation and position of compressor bleed valve 42. As used herein, the term "parameters" refers to physical properties whose values can be used to define the operational mode, orientation, position, and operating conditions of turbine engine 10 and/or compressor bleed valve 42, such as operating mode, compressor discharge temperature, compressor discharge pressure, compressor bleed valve operating position, rotational speed, vibrations and accelerations at defined locations.

Monitoring system 12 includes a first sensor 48, i.e. an proximity sensor, that is coupled to rotor assembly 26 for sensing a rotational speed of drive shaft 28 and that transmits a signal indicative of the sensed speed to controller 44. A second sensor 50, i.e. a pressure sensor, is coupled to compressor 32 for sensing a pressure of compressed air discharged from compressor 32, and transmits a signal indicative of the sensed compressor discharge pressure to controller 44. A third sensor 52, i.e. a temperature sensor, is coupled to compressor 32 for sensing a temperature of compressed air discharged from compressor 32, and that transmits a signal indicative of the sensed compressor discharge temperature to controller 44. In addition, monitoring system 12 includes a fourth sensor 54, i.e. a position sensor, that is coupled to compressor bleed valve 42 for sensing an operating position of compressor bleed valve 42, and that transmits a signal indicative of the sensed valve operating position to controller 44.

In the exemplary embodiment, controller 44 includes a processor 56 and a memory device 58. Processor 56 includes any suitable programmable circuit which may include one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor." Memory device 58 includes a computer readable medium, such as, without limitation, random access memory (RAM), flash memory, a hard disk drive, a solid state drive, a diskette, a flash drive, a compact disc, a digital video disc, and/or any suitable device that enables processor 56 to store, retrieve, and/or execute instructions and/or data.

In the exemplary embodiment, controller 44 includes a control interface 60 that is coupled to compressor bleed valve 42 to control an operation of compressor bleed valve 42. In addition, controller 44 also includes a sensor interface 62 that is coupled to at least one sensor 46 such as, for example, first, second, third, and fourth sensors 48, 50, 52, and 54. Each sensor 46 may transmit a signal continuously, periodically, or only once and/or any other signal timing that enables monitoring system 12 to function as described herein. Moreover, each sensor 46 may transmit a signal either in an analog form or in a digital form.

Controller 44 also includes a display 64 and a user interface 66. Display 64, in the exemplary embodiment, includes a vacuum fluorescent display (VFD) and/or one or more light-emitting diodes (LED). Additionally or alternatively, display 64 may include, without limitation, a liquid crystal display (LCD), a cathode ray tube (CRT), a plasma display, and/or any suitable visual output device capable of displaying graphical data and/or text to a user. In an exemplary embodiment, a turbine engine operating mode, a compressor bleed valve position, a turbine engine condition, a compressor bleed valve condition, and/or any other information may be displayed to a user on display 64. User interface 66 includes, without limitation, a keyboard, a keypad, a touch-sensitive screen, a scroll wheel, a pointing device, an audio input device employing speech-recognition software, and/or any suitable device that enables a user to input data into controller 44 and/or to retrieve data from controller 44. In one embodiment, user interface 66 is integrated with display 64 such that user interface 66 is accessed by a user via display 64. In the exemplary embodiment, user may input control parameters into controller 44 using user interface 66 to control an operation of turbine engine 10 and/or compressor bleed valve 42.

Various connections are available between control interface 60 and compressor bleed valve 42, between sensor interface 62 and sensors 46, and between processor 56, memory device 58, display 64, and user interface 66. Such connections may include, without limitation, an electrical conductor, a low-level serial data connection, such as Recommended Standard (RS) 232 or RS-485, a high-level serial data connection, such as Universal Serial Bus (USB) or Institute of Electrical and Electronics Engineers (IEEE) 1394 (a/k/a FIREWIRE), a parallel data connection, such as IEEE 1284 or IEEE 488, a short-range wireless communication channel such as BLUETOOTH, and/or a private (e.g., inaccessible outside turbine engine 10) network connection, whether wired or wireless.

In the exemplary embodiment, controller 44 receives a signal indicative of an operating parameter of turbine engine 10 from sensor 46, and determines an operating mode of turbine engine 10 based at least in part on the sensed turbine operating parameter. In addition, controller 44 receives a signal indicative of a sensed operational parameter of compressor bleed valve 42 from sensor 46, wherein the sensed operational parameter is associated with the determined turbine operating mode. Controller 44 calculates at least one operational value of compressor bleed valve 42 based at least in part on the sensed compressor bleed valve operational parameter, and determines a condition of turbine engine 10 based at least in part on the calculated compressor bleed valve operational value. Moreover, controller 44 determines a condition of turbine engine 10 to be less than a predefined turbine engine condition upon determining the calculated compressor bleed valve operational value to be different than a predefined compressor bleed valve operational value. In addition, controller 44 calculates a baseline operational value based at least in part on a plurality of calculated operational values that are associated with a plurality of turbine operating cycles. In the exemplary embodiment, controller 44 calculates a baseline operational value that is indicative of a normal operation of compressor bleed valve 42, wherein compressor bleed valve 42 operates without a failure, and turbine engine 10 operates within a predefined range of operating parameters. Controller 44 also determines a condition of turbine engine 10 to be less than a predefined turbine engine condition upon determining that the calculated compressor bleed valve operational value is different from the calculated baseline operational value.

In the exemplary embodiment, controller 44 includes a turbine operation module 68, a valve performance module 70, a baseline operation module 72, a predictive operation module 74, and a notification module 76. Turbine operation module 68 is configured to receive from sensor 46 signals indicative of operating parameters of turbine engine 10, and determine an operating mode of turbine engine 10 based at least in part on the received signals. In the exemplary embodiment, turbine operation module 68 receives a signal indicative of a rotational speed of drive shaft 28 from proximity sensor 48, and calculates an operational mode ($TE_o$) of turbine engine 10 based at least in part on the sensed rotational speed. Turbine operation module 68 transmits a signal indicative of the determined operation mode ($TE_o$) to valve performance module 70, baseline operation module 72, and predictive operation module 74.

Valve performance module 70 calculates a plurality of operational values (CBV) indicative of a condition of compressor bleed valve 42 associated with operational mode ($TE_o$). More specifically, sensor 46 transmits at least one monitoring signal indicative of an operating parameter of compressor bleed valve 42 to valve performance module 70. Valve performance module 70 calculates at least one compressor bleed valve operational value (CBV) associated with operational mode ($TE_o$) and transmits a signal indicative of the calculated operational value (CBV) to predictive operation module 74 and baseline operation module 72.

Predictive operation module 74 determines a condition of turbine engine 10 based at least in part on the calculated operational value (CBV). More specifically, predictive operation module 74 determines a condition of turbine engine 10 to be less than a predefined turbine engine condition upon determining the calculated operational value (CBV) to be different than a predefined operational value ($CBV_p$).

Baseline operation module 72 receives a plurality of calculated operational values (CBV) from valve performance module 70 associated with a plurality of turbine engine operating cycles, wherein each calculated operational value (CBV) is associated with a calculated turbine engine operational mode ($TE_o$). Baseline operation module 72 calculates a baseline operational value ($CBV_b$) based at least in part on the plurality of calculated operational values (CBV), and transmits a signal indicative of the calculated baseline operational value ($CBV_b$) to predictive operation module 74. In one embodiment, predictive operation module 74 determines a condition of turbine engine 10 to be less than a predefined turbine engine condition upon determining the calculated operational value (CBV) to be different than the calculated baseline operational value ($CBV_b$). In addition, in one embodiment, predictive operation module 74 determines a condition of compressor bleed valve 42 to be indicative of a failure of compressor bleed valve 42 upon determining the calculated operational value (CBV) to be different than the calculated baseline operational value ($CBV_b$).

Notification module 76 transmits a first notification signal indicative of a first alarm to display 64 after predictive operation module 74 determines a condition of turbine engine 10 to be less than a predefined turbine engine condition. Moreover, notification module 76 transmits a second notification signal indicative of a second alarm to display 64 after prediction module determines a condition of compressor bleed valve 42 to be a failure of compressor bleed valve 42.

In the exemplary embodiment, valve performance module 70 receives a first signal indicative of a sensed compressor discharge temperature from temperature sensor 52, and calculates a first operational value ($CBV_1$) based at least in part on the sensed compressor discharge temperature. In one embodiment, first operational value ($CBV_1$) represents a change in compressor discharge temperature over time. In addition, baseline operation module 72 calculates a first baseline operational value ($CBV_{b1}$) based at least in part on a plurality of first operational values ($CBV_1$). Predictive operation module 74 determines a condition of turbine engine 10 to be less than a predefined turbine engine condition upon determining the calculated first operational value ($CBV_1$) to be different than the calculated first baseline operational value ($CBV_{b1}$).

In one embodiment, baseline operation module 72 calculates first baseline operational value ($CBV_{b1}$) including a normal distribution including mean and standard deviation of compressor discharge temperatures during start-up mode and shutdown mode. Valve performance module 70 calculates first operational value ($CBV_1$) including a z-score based at least in part on the calculated normal distribution. Predictive operation module 74 determines a condition of turbine engine 10 to be less than a predefined turbine engine condition upon determining the calculated first operational value ($CBV_1$) including the calculated compressor discharge temperature z-score to be different than a predefined z-score.

Valve performance module 70 also receives a signal indicative of a sensed compressor discharge pressure from pressure sensor 50, and calculates a second operational value ($CBV_2$) based at least in part on the sensed compressor discharge pressure. Baseline operation module 72 calculates a second baseline operational value ($CBV_{b2}$) based at least in part on a plurality of second operational values ($CBV_2$). Predictive operation module 74 determines a condition of turbine engine 10 to be less than a predefined turbine engine condition upon determining the calculated second operational value ($CBV_2$) to be different than the calculated second baseline operational value ($CBV_{b2}$).

In one embodiment, valve performance module 70 calculates second operational value ($CBV_2$) including a pressure decay rate of compressor 32 during shutdown mode based at least in part on the sensed compressor discharge pressure. The calculated pressure decay rate includes a rate at which the sensed compressor discharge pressure decreases during a predefined period of time during shutdown mode. Predictive operation module 74 determines a condition of turbine engine 10 to be less than a predefined turbine engine condition upon determining the calculated second operational value ($CBV_2$) including the calculated pressure decay rate to be different than a predefined compressor discharge pressure decay rate. In another embodiment, valve performance module 70 calculates second operational value ($CBV_2$) including a pressure rise rate of compressor 32 during start-up mode. The calculated pressure rise rate includes a rate at which the sensed compressor discharge pressure increases during a predefined period of time during start-up mode. Predictive operation module 74 determines a condition of turbine engine 10 to be less than a predefined turbine engine condition upon determining the calculated second operational value ($CBV_2$) including the calculated pressure rise rate to be different than a predefined compressor discharge pressure rise rate.

In addition, controller 44 transmits a plurality of command signals to compressor bleed valve 42 to reposition compressor bleed valve 42. The plurality of command signals are transmitted consecutively from controller 44 to compressor bleed valve 42. Position sensor 54 transmits a validation signal indicative of a position of compressor bleed valve 42. Valve performance module 70 calculates a slew rate indicative of a period of time between a time an initial command signal is transmitted to compressor bleed valve 42 and the validation signal is transmitted to valve performance module 70 indicating the compressor bleed valve 42 is repositioned in response to the command signal. Moreover, performance module calculates a third operational value ($CBV_3$) based at least in part on the calculated slew rate. In addition, baseline operation module 72 calculates a third baseline operational value ($CBV_{b3}$) based at least in part on a plurality of third operational values ($CBV_3$). Predictive operation module 74 determines a condition of turbine engine 10 to be less than a predefined turbine engine condition upon determining the calculated third operational value ($CBV_3$) to be different than the calculated third baseline operational value ($CBV_{b3}$).

In the exemplary embodiment, valve performance module 70 also calculates an amount of occurrences a command signal is transmitted to compressor bleed valve 42 before receiving a validation signal from position sensor 54. Valve performance module 70 calculates a fourth operational value ($CBV_4$) based at least in part on the calculated amount of command signals transmitted to compressor bleed valve 42. In addition, baseline operation module 72 calculates a fourth baseline operational value ($CBV_{b4}$) based at least in part on a plurality of fourth operational values ($CBV_4$). Predictive operation module 74 determines a condition of turbine engine 10 to be less than a predefined turbine engine condition upon determining the calculated fourth operational value ($CBV_4$) to be different than the calculated fourth baseline operational value ($CBV_{b4}$).

In one embodiment, predictive operation module 74 calculates an operational value error (e) based at least in part on the difference between the calculated operational value (CBV) and the calculated baseline operation valve ($CBV_b$). In addition, predictive operation module 74 calculates a first operational value error ($e_1$) between first operational value ($CBV_1$) and first baseline operational value ($CBV_{b1}$), calculates a second operational value error ($e_2$) between second operational value ($CBV_2$) and second baseline operational value ($CBV_{b2}$), calculates a third operational value error ($e_3$) between third operational value ($CBV_3$) and third baseline operational value ($CBV_{b3}$), and/or calculates a fourth operational value error ($e_4$) between fourth operational value ($CBV_4$) and fourth baseline operational value ($CBV_{b4}$). In the exemplary embodiment, predictive operation module 74, applies one or more weighting factors ($\alpha$, $\beta$, $\gamma$, $\delta$ and n-factor) to each first operational value error ($e_1$), second operational value error ($e_2$), third operational value error ($e_3$), and fourth operational value error ($e_4$) to calculate a collective operational error value ($e_c$). Predictive operation module 74 determines a condition of turbine engine 10 to be less than a predefined turbine engine condition upon determining the collective operational value error ($e_c$) to be different than a predefined operational value error.

In another embodiment, predictive operation module 74, applies one or more weighting factors ($\alpha$, $\beta$, $\gamma$, $\delta$ and n-factor) to each first operational value ($CBV_1$), second operational value ($CBV_2$), third operational value ($CBV_3$), and fourth operational value ($CBV_4$) to calculate a collective operational value ($CBV_C$). In addition, predictive operation module 74 also applies one or more weighting factors ($\alpha$, $\beta$, $\gamma$, $\delta$ and n-factor) to each first baseline operational value ($CBV_{b4}$), second baseline operational value ($CBV_{b4}$), third baseline operational value ($CBV_{b4}$), and fourth baseline operational value ($CBV_{b4}$) to calculate a collective operational value ($CBV_{bc}$). In the exemplary embodiment, predictive operation module 74 determines a condition of turbine engine 10 to be less than a predefined turbine engine condition upon determining the collective operational value ($CBV_c$) to be different than the calculated collective baseline operational value ($CBV_{bc}$).

Figure 3:
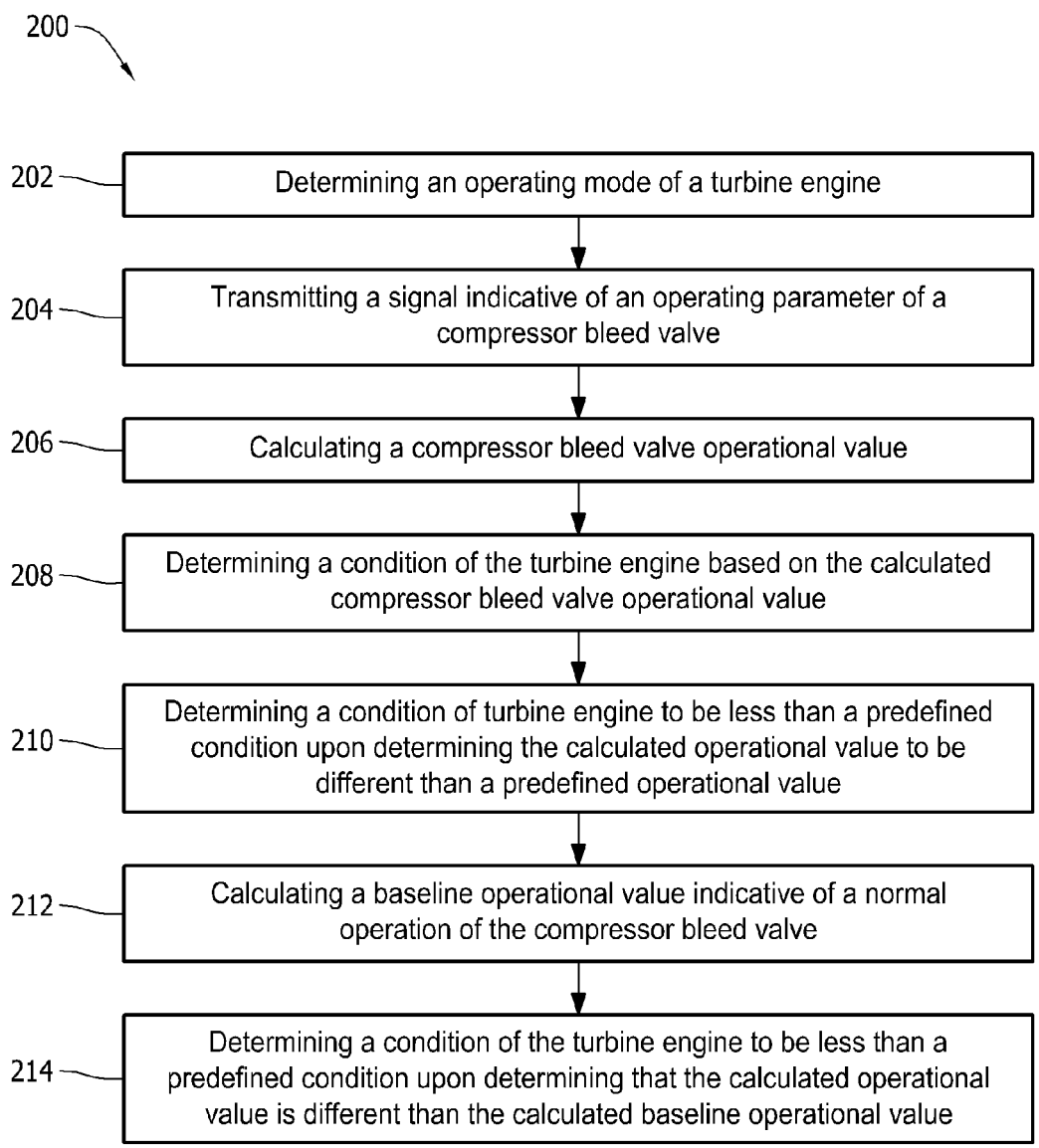
FIG. 3 is a flow chart of an exemplary method that may be used to monitor an operation of the turbine engine shown in FIG. 1.

FIG. 3 is a flow chart of an exemplary method that may be used to monitor turbine engine 10. Method 200 includes determining 202, by controller 44, an operating mode of turbine engine 10, and transmitting 204 at least one monitoring signal indicative of an operating parameter of compressor bleed valve 42 from sensor 46 to controller 44. Method 200 also includes calculating 206 at least one operational value (CBV) based at least in part on the received monitoring signal, and determining 208 a condition of turbine engine 10 based at least in part on the calculated compressor bleed valve operational value (CBV). Moreover, method 200 includes determining 210 a condition of turbine engine 10 to be less than a predefined condition upon determining the calculated compressor bleed valve operational value (CBV) to be different than a predefined compressor bleed valve operational value ($CBV_p$). In one embodiment, method 200 includes calculating 212 a baseline operational value ($CBV_b$) that is indicative of a normal operation of compressor bleed valve 42 based at least in part on the monitoring signal, and determining 214 a condition of the turbine engine to be less than a predefined condition upon determining that the calculated compressor bleed valve operational value is different than the calculated baseline operational value.

In one embodiment, method 200 includes transmitting a monitoring signal indicative of a discharge temperature of compressor 32, and calculating a first operational value ($CBV_1$) based at least in part on the sensed compressor discharge temperature. Method 200 also includes transmitting a monitoring signal indicative of a discharge pressure of compressor 32, and calculating a second operational value ($CBV_2$) based at least in part on the sensed compressor discharge pressure. In addition, method 200 includes transmitting a command signal indicative of a command to operate compressor bleed valve 42, from controller 44 to compressor bleed valve 42, and transmitting a validation signal indicative of a completed operation. Moreover, method 200 includes calculating a slew rate indicative of a period of time between commanding compressor bleed valve 42 to operate, and validating an operation of compressor bleed valve 42. A third compressor bleed valve operational value ($CBV_3$) is calculated based at least in part on the calculated compressor bleed valve slew rate. Method 200 also includes transmitting a plurality of command signals to compressor bleed valve 42, wherein each command signal is transmitted consecutively, transmitting a validation signal indicative of a completed operation, and calculating an amount of occurrences a command signal was transmitted to compressor bleed valve 42 upon receiving the validation signal. In addition, method 200 includes calculating a fourth compressor bleed valve operational value ($CBV_4$) based at least in part on the calculated amount of command signals.

The above-described systems and methods overcome at least some disadvantages of known testing systems by providing a condition monitoring system that facilitates monitoring a condition of a compressor bleed valve while the turbine engine system remains online. As such, the compressor bleed valve is not required to be removed from service and/or dismantled to determine if the compressor bleed valve operates within acceptable operation parameters. By determining the condition of the compressor bleed valve, the condition monitoring system facilitates preventing conditions such as turbine engine trip, thereby reducing the costs of operating the turbine engine and extending the operational life of a turbine engine system.

An exemplary technical effect of the methods, system, and apparatus described herein includes at least one of (a) determining, by a controller, an operating mode of the turbine engine; (b) transmitting, from a sensor to the controller, at least one monitoring signal indicative of an operating parameter of a compressor bleed valve; (c) calculating at least one operational value of the compressor bleed valve based at least in part on the received monitoring signal, wherein the calculated operational value is associated with the determined operating mode; and (d) determining a condition of the turbine engine based at least in part on the calculated compressor bleed valve operational value.

Exemplary embodiments of systems and methods of monitoring turbine engines are described above in detail. The systems and methods are not limited to the specific embodiments described herein, but rather, components of the systems and/or steps of the methods may be utilized independently and separately from other components and/or steps described herein. For example, the methods may also be used in combination with other power generation systems, and are not limited to practice with only the turbine engine as described herein. Rather, the exemplary embodiment can be implemented and utilized in connection with many other power generation system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system for use with a turbine engine, wherein the turbine engine includes a compressor and at least one compressor bleed valve coupled to the compressor, said monitoring system comprising:
   at least one positional sensor configured to sense an operational parameter of the compressor bleed valve during operation of the turbine engine;
   at least one temperature sensor configured to sense an operational parameter of the turbine engine during operation of the turbine engine;
   at least one proximity sensor configured to sense a rotational speed of a drive shaft within the turbine and used to calculate an operational mode of the turbine engine during operation of the turbine engine; and
   a controller coupled to said at least one positional sensor, temperature and proximity sensors and to the compressor bleed valve, said controller comprising:
   a valve performance module, wherein the valve performance module is configured to receive from the at least one positional sensor, a plurality of positional sensor signals indicative of the compressor bleed valve operational parameter during operation of the turbine engine, and to receive from the at least one temperature sensor, a plurality of temperature sensor signals indicative of the turbine engine operational parameter during operation of the turbine engine, and to receive a plurality of turbine engine operating mode signals indicative of the turbine engine operational mode during operation of the turbine engine, and further wherein the valve performance module calculates a plurality of operational values indicative of a condition of the compressor bleed valve associated with a corresponding operational mode, in response to the plurality of positional sensor signals and the plurality of turbine engine operating mode signals and further calculates a plurality of operational values indicative of a condition of the turbine engine in response to the plurality of temperature sensor signals and the plurality of turbine engine operating mode signals;
   a baseline operation module in communication with the valve performance module, wherein the baseline operation module calculates a plurality of compressor bleed valve baseline operational values in response to the corresponding plurality of compressor bleed valve operational values during operation of the turbine engine, and further calculates a plurality of turbine engine baseline operational values in response to the corresponding plurality of turbine engine operational values during operation of the turbine engine;
   a turbine operation module in communication with the valve performance module, wherein the turbine operation module is configured to receive from the at least one proximity sensor, a monitoring signal indicative of the turbine engine operational mode during operation of the turbine engine, and further wherein the turbine operation module generates the plurality of turbine engine operating mode signals in response to the at least one proximity sensor monitoring signal during operation of the turbine engine;
   a predictive operation module in communication with the valve performance module, baseline operation module, and turbine operation module, wherein the predictive operation module determines a condition of the turbine engine based at least partially on the plurality of bleed valve calculated operational values, bleed valve calculated baseline operational values or the turbine engine operational mode during operation of the turbine engine; and
   a notification module in communication with the predictive operation module, wherein the predictive module is programmed to determine the condition of the turbine engine to be less than a predefined turbine engine condition, and the notification module is programmed to generate a first alarm notification signal in response thereto during operation of the turbine engine.

2. A monitoring system in accordance with claim 1, wherein said controller is programmed to determine the condition of the turbine engine to be less than a predefined condition upon determining a calculated compressor bleed valve operational value is different from a predefined compressor bleed valve operational value.

3. A monitoring system in accordance with claim 1, wherein said controller is further programmed to calculate a baseline operational value indicative of a normal operation of the compressor bleed valve based at least in part on the positional sensor signal.

4. A monitoring system in accordance with claim 3, wherein said controller is further programmed to determine the condition of the turbine engine to be less than a predefined condition upon determining that a calculated compressor bleed valve operational value is different from the a calculated baseline operational value.

5. A monitoring system in accordance with claim 1, wherein said at least one temperature sensor is configured to sense a discharge temperature of the compressor, said controller programmed to calculate an operational value of the compressor bleed valve based at least in part on the sensed compressor discharge temperature.

6. A monitoring system in accordance with claim 1, wherein said at least one positional sensor is configured to sense a position of the compressor bleed valve and to transmit a signal indicative of the sensed position, said controller programmed to:
   transmit, to the compressor bleed valve, a command signal indicative of a command to operate;
   calculate a slew rate indicative of a period of time between commanding the compressor bleed valve to operate and validating a position of the compressor bleed valve; and
   calculate a compressor bleed valve operational value based at least in part on the calculated compressor bleed valve slew rate.

7. A monitoring system in accordance with claim 1, wherein said at least one positional sensor is configured to sense a position of the compressor bleed valve and to transmit a signal indicative of the sensed position, said controller programmed to:
   transmit, to the compressor bleed valve, a plurality of command signals, wherein each command signal is indicative of a command to operate, and wherein each command signal is transmitted consecutively;
calculate an amount of occurrences a command signal was transmitted to the compressor bleed valve; and
calculate the compressor bleed valve operational value based at least in part on the calculated amount of occurrences a command signal was transmitted.

8. A monitoring system in accordance with claim 1, wherein said at least one temperature sensor is configured to sense a discharge pressure of the compressor, said controller programmed to calculate an operational value of the compressor bleed valve based at least in part on the sensed compressor discharge pressure.

9. A turbine engine comprising:
a compressor;
a turbine coupled in flow communication with said compressor to receive at least some of the air discharged by said compressor;
at least one compressor bleed valve coupled to said compressor; and
a monitoring system operatively coupled to said compressor bleed valve and to said compressor, said monitoring system comprising:
at least one positional sensor configured to sense an operational parameter of said compressor bleed valve during operation of the turbine engine;
at least one temperature sensor configured to sense an operational parameter of the turbine engine during operation of the turbine engine;
at least one proximity sensor configured to sense an operational mode of the turbine engine during operation of the turbine engine; and
a controller coupled to said at least one positional, temperature and proximity sensors and to said compressor bleed valve, said controller comprising:
a valve performance module, wherein the valve performance module is configured to receive from the at least one positional sensor, a plurality of positional sensor signals indicative of the compressor bleed valve operational parameter during operation of the turbine engine, and to receive from the at least one temperature sensor, a plurality of temperature sensor signals indicative of the turbine engine operational parameter during operation of the turbine engine, and to receive a plurality of turbine engine operating mode signals indicative of the turbine engine operational mode during operation of the turbine engine, and further wherein the valve performance module is calculates a plurality of operational values indicative of a condition of the compressor bleed valve associated with a corresponding operational mode, in response to the plurality of positional sensor signals and the plurality of turbine engine operating mode signals and further calculates a plurality of operational values indicative of a condition of the turbine engine in response to the plurality of temperature sensor signals and the plurality of turbine engine operating mode signals;
a baseline operation module in communication with the valve performance module, wherein the baseline operation module calculates a plurality of compressor bleed valve baseline operational values in response to the corresponding plurality of compressor bleed valve operational values during operation of the turbine engine, and further calculates a plurality of turbine engine baseline operational values in response to the corresponding plurality of turbine engine operational values during operation of the turbine engine;
a turbine operation module in communication with the valve performance module, wherein the turbine operation module is configured to receive from the at least one proximity sensor, a monitoring signal indicative of the turbine engine operational mode during operation of the turbine engine, and further wherein the turbine operation module generates the plurality of turbine engine operating mode signals in response to the at least one proximity sensor monitoring signal during operation of the turbine engine;
a predictive operation module in communication with the valve performance module, baseline operation module, and turbine operation module, wherein the predictive operation module determines a condition of the turbine engine based at least partially on the plurality of bleed valve calculated operational values, bleed valve calculated baseline operational values or the turbine engine operational mode during operation of the turbine engine; and
a notification module in communication with the predictive operation module, wherein the predictive module is programmed to determine the condition of the turbine engine to be less than a predefined turbine engine condition, and the notification module is programmed to generate a first alarm notification signal in response thereto during operation of the turbine engine.

10. A turbine engine in accordance with claim 9, wherein said controller is programmed to determine the condition of said turbine engine to be less than a predefined condition upon determining a calculated compressor bleed valve operational value is different from a predefined compressor bleed valve operational value.

11. A turbine engine in accordance with claim 9, wherein said controller is further programmed to:
calculate a baseline operational value indicative of a normal operation of the compressor bleed valve based at least in part on the t positional sensor signal; and
determine the condition of said turbine engine to be less than a predefined condition upon determining that a calculated compressor bleed valve operational value is different from a calculated baseline operational value.

12. A turbine engine in accordance with claim 9, wherein said at least one temperature sensor is configured to sense a discharge temperature of the compressor, said controller programmed to calculate an operational value of the compressor bleed valve based at least in part on the sensed compressor discharge temperature.

13. A method of monitoring a turbine engine including a compressor and a compressor bleed valve coupled to the compressor, said method comprising:
providing a controller comprising:
a valve performance module, wherein the valve performance module is configured to receive from the at least one positional sensor, a plurality of positional sensor signals indicative of the compressor bleed valve operational parameter during operation of the turbine engine, and to receive from the at least one temperature sensor, a plurality of temperature sensor signals indicative of the turbine engine operational parameter during operation of the turbine engine, and to receive a plurality of turbine engine operating mode signals indicative of the turbine engine operational mode during operation of the turbine engine, and further wherein the valve performance module is calculates a plurality of operational values indicative of a condition of the compressor bleed valve associated with a corresponding operational mode, in response to the plurality of positional sensor signals and the plurality of turbine engine operating mode signals and further calculates a plurality of operational values indicative of a condition of the turbine engine in response to the plurality of temperature sensor signals and the plurality of turbine engine operating mode signals;

a baseline operation module in communication with the valve performance module, wherein the baseline operation module calculates a plurality of compressor bleed valve baseline operational values in response to the corresponding plurality of compressor bleed valve operational values during operation of the turbine engine, and further calculates a plurality of turbine engine baseline operational values in response to the corresponding plurality of turbine engine operational values during operation of the turbine engine;

a turbine operation module in communication with the valve performance module, wherein the turbine operation module is configured to receive from the at least one proximity sensor, a monitoring signal indicative of the turbine engine operational mode during operation of the turbine engine, and further wherein the turbine operation module calculates the plurality of turbine engine operating mode signals in response to the at least one proximity sensor monitoring signal during operation of the turbine engine;

a predictive operation module in communication with the valve performance module, baseline operation module, and turbine operation module, wherein the predictive operation module determines a condition of the turbine engine based at least partially on the plurality of bleed valve calculated operational values, bleed valve calculated baseline operational values or the turbine engine operational mode during operation of the turbine engine; and a notification module in communication with the predictive operation module, wherein the predictive module is programmed to determine the condition of the turbine engine to be less than a predefined turbine engine condition, and the notification module is programmed to generate a first alarm notification signal in response thereto during operation of the turbine engine;

determining, by the controller, an operating mode of the turbine engine during operation of the turbine engine;

calculating during operation of the turbine engine, at least one operational value of the compressor bleed valve based at least in part on the received plurality of positional sensor signals, wherein the calculated operational value is associated with the determined operating mode; and determining during operation of the turbine engine, a condition of the turbine engine based at least in part on the calculated compressor bleed valve operational value.

14. A method in accordance with claim 13, further comprising determining the condition of the turbine engine to be less than a predefined condition upon determining that a calculated compressor bleed valve operational value is different from a predefined compressor bleed valve operational value.

15. A method in accordance with claim 13, further comprising calculating a baseline operational value indicative of a normal operation of the compressor bleed valve based at least in part on the plurality of positional sensor monitoring signals.

16. A method in accordance with claim 15, further comprising determining the condition of the turbine engine to be less than a predefined condition upon determining that a calculated compressor bleed valve operational value is different from a calculated baseline operational value.

17. A method in accordance with claim 13, further comprising:
transmitting a monitoring signal indicative of a discharge temperature of the compressor; and
calculating an operational value of the compressor bleed valve based at least in part on the sensed compressor discharge temperature.

18. A method in accordance with claim 13, further comprising:
transmitting, from the controller to the compressor bleed valve, a command signal indicative of a command to operate;
transmitting, from the compressor bleed valve to the controller, a validation signal indicative of a completed operation;
calculating a slew rate indicative of a period of time between commanding the compressor bleed valve to operate and validating an operation of the compressor bleed valve; and
calculating the compressor bleed valve operational value based at least in part on the calculated compressor bleed valve slew rate.

19. A method in accordance with claim 13, further comprising:
transmitting, from the controller to the compressor bleed valve, a plurality of command signals, wherein each command signal is indicative of a command to operate, and wherein each command signal is transmitted consecutively;
transmitting, from the compressor bleed valve to the controller, a validation signal indicative of a completed operation;
calculating an amount of occurrences a command signal was transmitted to the compressor bleed valve upon receiving the validation signal; and
calculating the compressor bleed valve operational value based at least in part on the calculated amount of occurrences a command signal was transmitted.

20. A method in accordance with claim 13, further comprising:
transmitting a signal indicative of a discharge pressure of the compressor; and
calculating an operational value of the compressor bleed valve based at least in part on the sensed compressor discharge pressure.

* * * * *

UNITED STATES PATENT AND TRADEMARK OFFICE
CERTIFICATE OF CORRECTION

PATENT NO. : 9,068,463 B2  
APPLICATION NO. : 13/304058  
DATED : June 30, 2015  
INVENTOR(S) : Pandey et al.

It is certified that error appears in the above-identified patent and that said Letters Patent is hereby corrected as shown below:

In the specification

Column 9, Line 32, delete "value ($CBV_{b4}$)," and insert -- value ($CBV_{b1}$), --, therefor.

Column 9, Lines 33-34, delete "second baseline operational value ($CBV_{b4}$), third baseline operational value ($CBV_{b4}$)," and insert -- second baseline operational value ($CBV_{b2}$), third baseline operational value ($CBV_{b3}$), --, therefor.

Column 10, Line 42, delete "one of" and insert -- one of: --, therefor.

In the claims

Column 12, Line 40, Claim 4, delete "from the a" and insert -- from a --, therefor.

Column 13, Line 48, Claim 9, delete "is calculates" and insert -- calculates --, therefor.

Column 14, Line 37, Claim 11, delete "on the t" and insert -- on the --, therefor.

Column 14, Line 64, Claim 13, delete "is calculates" and insert -- calculates --, therefor.

Signed and Sealed this  
Twenty-fourth Day of May, 2016

Michelle K. Lee  
*Director of the United States Patent and Trademark Office*